United States Patent [19]

Hunt

[11] Patent Number: 5,145,214
[45] Date of Patent: Sep. 8, 1992

[54] ADJUSTABLE METER SETTER

[76] Inventor: Mitchell Hunt, 1165 Park Ave., Murfreesboro, Tenn. 37130

[21] Appl. No.: 729,589

[22] Filed: Jul. 15, 1991

[51] Int. Cl.$^5$ .............................................. F16L 9/00
[52] U.S. Cl. ........................................ 285/30; 73/201
[58] Field of Search ...................... 285/30; 4/195, 196; 73/201

[56] References Cited

U.S. PATENT DOCUMENTS

| | | | |
|---|---|---|---|
| T100,605 | 5/1981 | Christian | 249/68 R |
| 855,314 | 5/1907 | Holmes | 285/30 |
| 988,930 | 4/1911 | Corbett et al. | 285/30 |
| 1,142,667 | 6/1915 | Calhoun | 285/30 |
| 1,201,568 | 10/1916 | Dish | 285/30 |
| 1,282,024 | 10/1918 | Bartholomay | 285/30 |
| 1,290,665 | 1/1919 | Russell . | |
| 1,969,432 | 8/1934 | Smith | 73/201 |
| 2,574,982 | 11/1951 | Mueller . | |
| 2,576,630 | 11/1951 | Mueller . | |
| 3,970,334 | 7/1976 | Campbell . | |
| 4,305,282 | 12/1981 | Hunt | 73/201 |
| 4,549,751 | 10/1985 | Grove | 285/30 |
| 4,724,797 | 2/1988 | Steudler | 248/68.1 |
| 4,993,670 | 2/1991 | Tesar | 248/68.1 |

OTHER PUBLICATIONS

"Water Meter Installation Applications," Watts Regulator Company, Technical Notice 5-7-AP 813.

Primary Examiner—Randolph A. Reese
Assistant Examiner—Timothy Aberle
Attorney, Agent, or Firm—Parmelee, Bollinger & Bramblett

[57] ABSTRACT

A setter for a water meter comprises a pair of L-shaped pipes which are positioned in reversed relationship with their horizontal legs connected between a water supply line and a water distribution line. The horizontal legs are clamped in side by side relationship to vary the distance between the vertical legs. Adjustment of the clamp permits the setter to accept meters of different size. All joints are threaded, thereby avoiding the use of solder and the consequent danger of lead contamination.

4 Claims, 1 Drawing Sheet

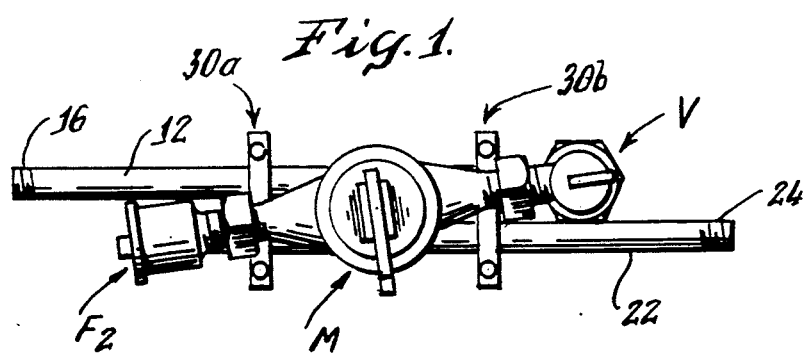
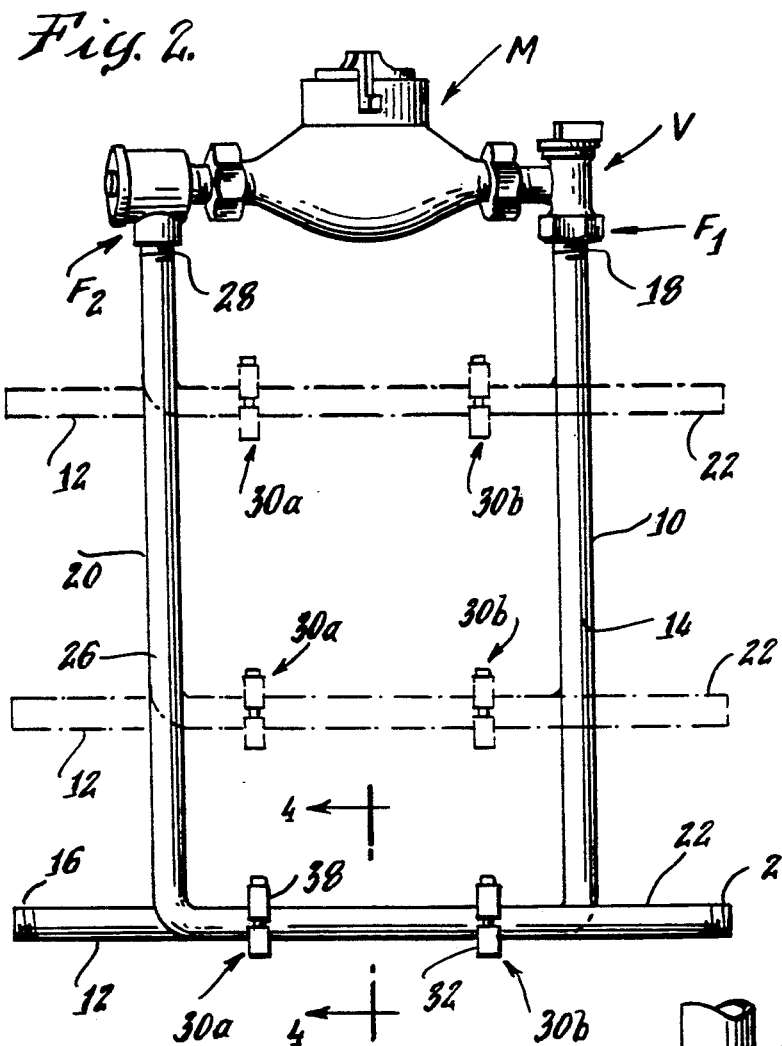
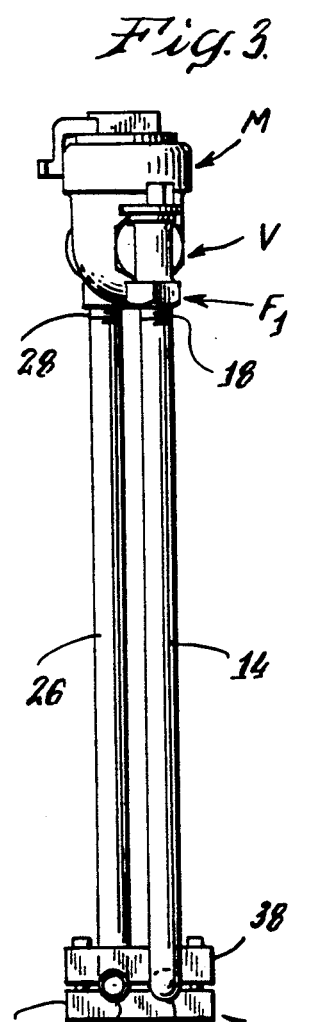
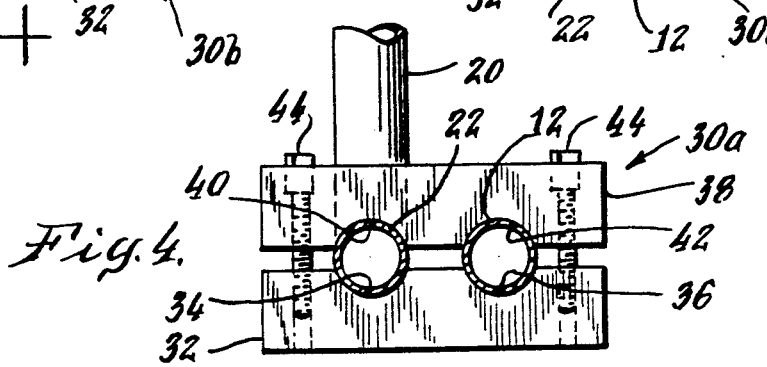

ADJUSTABLE METER SETTER

TECHNICAL FIELD

This invention relates to setters for water meters and, in particular, to setters which are adjustable to accept meters of different sizes.

BACKGROUND ART

Water meters are conventionally mounted in yoke-type supports (or "setters") which employ cast members of brass or other suitable materials. One difficulty with such supports is that they are not adaptable to different sized water meters. Accordingly, if a water meter is changed, it is often necessary to replace the yoke support as well. Various attempts have been made to provide adjustable meter supports. However, these typically require relatively complex and specially designed members. Examples of such prior art devices are of Russell U.S. Pat. No. 1,290,665, of Mueller U.S. Pat. No. 2,574,982, of Mueller U.S. Pat. No. 2,576,630, of Campbell 3,970,334, and of Grove U.S. Pat. No. 4,549,751.

Another disadvantage of the prior art meter supports is that they require soldered connections. Solder, of course, contains lead which is a public health hazard. As a result, the use of solder is sharply curtailed and essentially limited by regulations of the Environmental Protection Agency under the Safe Drinking Water Act.

Accordingly, it is a primary object of this invention to provide a simplified adjustable water meter support. Another object is to provide such a support which does not require the use of soldered connections. Other objects, features, and advantages will be apparent from the following description and appended claims.

DISCLOSURE OF INVENTION

The invention comprises a pair of L-shaped pipes which are positioned in reversed relationship with their horizontal legs parallel with one another in side by side relationship. One of the horizontal legs is connected to a water supply line. The other horizontal leg is connected to a water distribution line. The vertical legs of the pipes extend upwardly and are threaded to engage the end fittings of a water meter. Clamps are provided which engage the horizontal legs of the pipes to thereby form a rigid but adjustable support for a water meter.

BRIEF DESCRIPTION OF DRAWINGS

FIG. 1 is a top view of a water meter mounted in the meter support of this invention;

FIG. 2 is an elevational view of the meter and support of FIG. 1;

FIG. 3 is an end view of the meter and support of FIGS. 1 and 2; and

FIG. 4 is a cross-section taken substantially along the line 4—4 of FIG. 2.

BEST MODE FOR CARRYING OUT THE INVENTION

With particular reference to FIGS. 1-3, there is illustrated a water meter M which is provided with an inlet valve V and end fittings $F_1$, $F_2$. The support for the meter comprises an L-shaped pipe 10 having a horizontal leg 12 and a vertical leg 14. The horizontal leg 12 has a threaded end 16 for connection to a water supply line. The vertical leg 14 terminates in a threaded end 18 which connects to inlet end fitting $F_1$ of water meter M.

A second L-shaped pipe 20 includes a horizontal leg 22 which connects to a water distribution system through a threaded end 24 and a vertical leg 26 which has a threaded end 28 for connection to the discharge fitting $F_2$ of meter M. The horizontal legs of the two L-shaped pipes are interconnected by a pair of clamps 30a, b.

The clamps which interconnect the horizontal legs and provide the desired adjustability are essentially identical. As shown in FIG. 4, each comprises a base jaw 32 having a pair of arcuate pipe-supporting recesses 34, 36 on its upper surface. An upper jaw 38 has a similar pair of recesses 40, 42 on its lower surface. The upper and lower jaws are caused to clampingly engage the horizontal legs 12, 22 by means of screws 44.

To adjust the support of this invention to a different water meter size, clamps 30a, 30b are loosened by backing off the screws 44. Thereupon the horizontal legs 12, 22 may be moved together or apart until the threaded ends 18, 28 of the vertical legs are positioned to engage the new meter. Since only threaded fittings are employed, the need for solder joints is eliminated.

It will be apparent that the relative dimensions illustrated are exemplary only. For example, the vertical legs may be varied in length as illustrated in the dash-dot line drawings of FIG. 2. It will also be apparent that a number of other variations and modifications may be made in this invention without departing from its spirit and scope. Accordingly, the foregoing description is to be construed as illustrative only, rather than limiting.

This invention is limited only by the scope of the following claims.

I claim:

1. A setter for a water meter which comprises:
   a first substantially L-shaped pipe having a first leg connectable to a water supply line and a second leg connectable to the input port of a water meter;
   a second substantially L-shaped pipe having a first leg connectable to a water distribution line and a second leg connectable to the discharge port of said water meter;
   the first legs of said first and second pipes being in substantially parallel side by side relationship;
   the second legs of said first and second pipes being in substantially parallel, spaced relationship to support said water meter therebetween; and
   at least one clamp means engaging the first legs of both of said pipes to selectively vary the distance between the second legs of said first and second pipes to match the dimensions of said water meter.

2. The setter of claim 1 wherein said first legs are substantially horizontal and said second legs are substantially vertical.

3. The setter of claim 2 wherein said clamp means comprises first and second jaws engaging opposite sides of said first legs and means for compressively retaining said legs therebetween.

4. The setter of claim 3 wherein said retaining means comprises a screw interconnecting said first and second jaws.

* * * * *